United States Patent [19]

McGee

[11] 4,239,822

[45] Dec. 16, 1980

[54] PROPYLENE/POLYSTYRENE COMPOSITION AND METHOD FOR COATING

[75] Inventor: Theodore L. McGee, Appleton, Wis.

[73] Assignee: American Can Company, Greenwich, Conn.

[21] Appl. No.: 51,070

[22] Filed: Jun. 22, 1979

Related U.S. Application Data

[62] Division of Ser. No. 836,835, Sep. 26, 1977, Pat. No. 4,183,845.

[51] Int. Cl.$^3$ ............................................. B05D 3/12
[52] U.S. Cl. ................................. 427/358; 260/42.46; 260/42.56; 427/361; 427/398.2; 428/511
[58] Field of Search .................... 525/240; 260/42.46, 260/42.56; 427/358

[56] References Cited

U.S. PATENT DOCUMENTS

| | | | |
|---|---|---|---|
| 3,018,263 | 1/1962 | Schneider | 525/240 |
| 3,092,891 | 6/1963 | Baratti | 525/240 |
| 3,173,163 | 3/1965 | Cramton | 525/240 |
| 3,271,354 | 9/1966 | Weissert et al. | 260/41 |
| 3,652,725 | 3/1972 | Diaz et al. | 525/240 |
| 3,666,834 | 5/1972 | Bullard | 525/240 |

*Primary Examiner*—Carman J. Seccuro
*Attorney, Agent, or Firm*—Robert P. Auber; George P. Ziehmer; Ernestine C. Bartlett

[57] ABSTRACT

Melt extrudable polypropylene-polystyrene compositions are provided which are particularly suitable for use in extrusion coating. Substrates coated with such compositions as well as methods of producing such coated substrates are also provided.

5 Claims, No Drawings

PROPYLENE/POLYSTYRENE COMPOSITION AND METHOD FOR COATING

This is a division of application Ser. No. 836,835, filed Sept. 26, 1977, now U.S. Pat. No. 4,183,845.

BACKGROUND OF THE INVENTION

The extrusion of molten polymers and copolymers onto a moving substrate web is well known. The coating is usually accomplished by melting the polymer in an extruder, extruding the molten polymer through a slit-die to form a molten film and passing the web substrate, for example, a paper web and the extruded film simultaneously between two pressure rolls and thereby bonding the hot polymer film to the paper. Various polymers have been found to be suitable for such a procedure including polyethylene, copolymers of ethylene and propylene and various ethylene-acrylic acid copolymers. In the case of polypropylene and ethylene-propylene copolymers, although the high-temperature resistance is sufficient for extrusion coating application, the resultant films are not sufficiently rigid for some applications. On the other hand, polystyrene exhibits similar high-temperature resistance properties yet is so brittle that when extruded it tends to crack and exhibits poor adhesion to the substrate. The polymers are normally incompatible for blend purposes.

OBJECTS OF THE INVENTION

It is a primary object of this invention to provide an extrudable blend of polypropylene-polystyrene that is suitable for extrusion coating.

It is a further object of this invention to provide extrusion coatings of polypropylene/polystyrene, which may pigmented or unpigmented, and which combine the flexibility properties of polypropylene with the rigidity properties of polystyrene.

It is yet another object of this invention to provide coated substrates having good coating to substrate adhesion characterized by an exceptional aesthetical appeal by virtue of unique pearlescent appearance obtained under conditions particularly suitable for high-speed commercial production.

SUMMARY OF THE INVENTION

These and other objects will become apparent from the following description of the invention which are achieved by providing an extrudable polypropylene material exhibiting certain parameters of viscosity as measured by its melt flow rate and a polystyrene material compatible therewith, blending said materials, heating the resultant blend to a molten state and extruding the molten blend through a heated slot-type die onto a substrate employing conventional extrusion coating techniques and apparatus, the extrudable melt exhibiting highly satisfactory melt curtain stability at melt temperatures between about 475° F. to about 575° F.

DETAILED DESCRIPTION OF THE INVENTION

The above objects are accomplished when employing polypropylene/polystyrene blends, as more particularly defined hereinbelow, in an extrusion coating technique wherein the melt temperature is within the range of about 475° F. to about 575° F. employing blend ratios of polypropylene to polystyrene in the range of 5:1 to 2:1, preferably comprising 50 to 70% by weight of polypropylene, 10 to 30% by weight of polystyrene and, if desired, up to about 10% of an inorganic pigment or 5 to 30% of a concentrate of pigment in a polymeric carrier.

As used further herein, the following terms have the following meanings:

Melt curtain is the molten plastic web that is formed when the plastic resin pellets are melted and extruded through a narrow, for example 0.030 inch, linear die opening.

Melt flow rate is a measure of the viscosity of the polypropylene expressed in grams, per ten minutes as determined by ASTM method D1238-Condition G. Such method covers extrusion of molten resins through a die of a specified length and diameter under prescribed conditions of temperature, load and piston position in a piston plastometer and empirically defines parameters critically influenced by the physical properties and molecular structure of the polymer. The melt flow rate of the polypyropylene is critical herein as discussed further hereinbelow.

Melt performance is evaluated as the ability of the extrudate exiting the die to be drawn down to film thicknesses in the range of about 0.3 to 1 mil, preferably about 0.4 to 0.5 mil, extrusion coatings without tearing or streaking and without necking-in or otherwise exhibiting deformation at the melt curtain edges.

Satisfactory melt performance in accordance with the invention is a critical condition herein as discussed further hereinbelow.

Any combination of polypropylene and polystyrene capable of exhibiting the melt performance standard under the process conditions set forth hereinabove may be utilized in accordance with this invention.

The selection of suitable polystyrenes is determined primarily by the ability of the particular resin to withstand elevated extrusion temperatures without degradation into monomer and compatibility with the polypropylene component of the blend. Polystyrenes that degrade at the 475°–575° F. melt temperature, as evidenced by the emission of excessive smoke or burnt odor, are not satisfactory for use herein. It has been found that in general such polymers having average molecular weights greater than 200,000, preferably in the range of 250,000 to 325,000, and having low initial monomer levels, are suitable for use herein. Particularly suitable resins may be illustrated by high temperature resistant-low monomer content resins such as "Dow XP60690326w", "Dow 666u" and "Dow 685D", each commercially available from Dow Chemical Co., Midland, Mich.

Selection of the polypropylene resin suitable for use is likewise determined by the ability of the resin to withstand melt temperatures within the range of 475°–575° F. without degradation and compatibility with the polystyrene component of the blend. A suitable resin is a polypropylene homopolymer having a melt flow rate at 230° C. of about 30 to about 40 grams per ten minutes available commercially from Hercules, Inc. as "PD-131". The polypropylene in general may have molecular weights in the range of 100,000 to about 150,000 and include the homopolymer and copolymers of propylene and ethylene. However, as indicated hereinabove, the critical parameter of a melt flow rate between about 30 and about 40 grams per ten minutes is more definitive of operable polymers since it reflects more the molecular structure and processing history of the polymer. It has been found that polypropylene homopolymers and copolymers with ethylene that do not exhibit the prescribed melt flow rate likewise do not exhibit the melt performance or compatibility properties necessary for operability in accordance with this invention.

It will be evident from the description of this invention that there are several related and interdependent factors of criticality necessary to the successful operation of this invention; namely, the melt temperature of the molten blend; the ratio of the components of the blend; the melt flow rate of the polypropylene polymer; and the high temperature stability of the polystyrene. It should be understood however that these parameters are to be evaluated in terms of the coating line speeds to which they relate. As used herein, satisfactory properties are evaluated at line speeds of about 500 to 1,000 feet per minute.

It has been found that melt temperatures lower than 475° F. result in melt curtains that are too viscous to be drawn down to suitable coating thicknesses while temperatures in excess of 575° F. seriously degrade the polystyrene resin component as evidenced by dense smoke coming off the melt curtain. At the same time, blends having a higher ratio than 5:1 of polypropylene to polystyrene result in severe neck-in of the melt curtain, i.e. instability at the edges of the melt curtain resulting in progressive narrowing and non-uniform coating.

The criticality of the melt flow rate may best be understood by the following examples in which a conventional extrusion coating line is employed except that the temperature of the chill roll is at 120° F. to aid in adhesion and to avoid loss of crystalline properties of the polypropylene. In general, temperatures of the chill roll should be maintained within the range of about 120° to 200° F. to obtain satisfactory results. A typical extrusion coating line will otherwise comprise supplying a substrate, electrostatically treated if desired to improve adhesion, from a suitable supply roll, with the running web passing under the extruder. Molten extrudate is continuously discharged from said extruder onto the running substrate web as a thin film through the extruder die gap. Immediately upon being applied to the surface of the substrate, the polymer is adhered to the surface of the substrate by passing the coated substrate between the nip of counter-rotating pressure rolls, designated herein as chill rolls. Due to the fact that the chill rolls are operating at a linear speed substantially in excess of that at which the molten polymer exits the dies, the extrudate is "drawn down" from the die gap thickness, for example 30 mils to a coating thickness, e.g. 0.30 mils.

EXAMPLE 1

The following polypropylenes and/or propylene-/ethylene copolymers were physically blended with polystyrene available commercially as Dow 666u, (Dow Chemical Co.) and extrusion coated onto paperboard at a coating weight of approximately 1 mil. The blend ratio of polypropylene to polystyrene was 4:1. The blend was extruded through a 1" extruder having a 30 mils die gap and was examined for melt performance of the blend. The results obtained were as indicated in the Table which follows wherein: PP indicates polypropylene; Grade refers to whether the polypropylene is film or extrusion grade. Polypropylenes are divided into such grades because of the different viscosity requirements needed for cast film vs. extrusion coating. Casting requires a high viscosity melt curtain while extrusion coating requires a lower viscosity to enable draw down to target coating weights. Melt flow rate refers to the flow rate of the polypropylene as measured by ASTM method D1238-Condition G.

TABLE

| PP | Grade | Melt Flow Rate | Melt Performance of Blend |
|---|---|---|---|
| (1) "SA-861" homopolymer[1] | Film | 8 | Tear off under MD tension |
| (2) "9670 BZ" homopolymer[2] | Film | 8 | Tear off under MD tension |
| (3) "PB 784" homopolymer[2] | Film | 9 | Tear off under MD tension |
| (4) "4018" homopolymer[3] | Film | 10 | Tear off under MD tension |
| (5) "PD-131" homopolymer[1] | Coating | 30 | Good stability under tension |
| (6) "P7673-499P" ethylene propylene copolymer[4] | Coating | 45 | Streaks & film splitting under tension |
| (7) "4G7DP" ethylene propylene copolymer[4] | Coating | 60 | Streaks in film, separates under MD tension |

[1]Hercules, Inc., Wilmington, Del.
[2]Diamond Shamrock Corp., Morristown, N. J.
[3]Amoco Chemicals, Inc., Naperville, Ill.
[4]Eastman Chemical Products, Inc., Kingston, Tenn.

It will be apparent from the table, that the melt flow rate of the polypropylene is a critical parameter herein since homopolymers and copolymers exhibiting melt flow rates outside the proscribed value are not satisfactory, the resulting blend either tearing under the process tension or resulting in streaking and/or film splitting under tension. When process conditions were varied, i.e. lower melt temperatures, different die gaps, etc. the poor performance blends could not be improved sufficiently to make them suitable for extrusion coating and comparable results were obtained.

The polypropylene defined is believed to be a highly unique hompolymer which by itself is unsuitable for use under the process conditions herein described because of unstable melt curtain edges. While at present a wide selection of such unique polymers does not appear to be commercially available, it will be understood that the invention contemplates substituting for the illustrated hompolymer any equivalent homopolymer or copolymer exhibiting the required melt flow rate and melt performance.

Various additives including pigments and anti-oxidants may be added to the polymer blends without detriment.

Anti-oxidants can be added to the polystyrenes to inhibit thermal degradation and prevent undesirable formation of monomer during processing of the melt. Suitable anti-oxidants include octadecyl-3-(3',5'-ditertiary butyl-4'-hydroxy phenyl) n-propionate and tetrakis[methylene 3-(3',5'-ditertiary butyl-4'-hydroxy phenyl) n-propionate]methane, available commerically as Irganox 1076 and Irganox 1010 (CIBA-GEIGY).

Various pigments and colorants may also be incorporated if desired to impart color and/or opacity. Pigments such as $TiO_2$ and carbon black may be added to the polymer blends per se or may be more conveniently dispersed in a carrier resin such as polyethylene which does not adversely affect the melt performance of the blend.

It has been found that when using mineral pigments such as $TiO_2$ or carbon black per se, amounts in excess of 10% by weight are to be avoided since higher concentrations result in dispersion and suspension problems of the pigment in the resin blend. Higher amounts of loading however may be realized with pigment concentrates, i.e. dispersions thereof in a polymeric carrier.

Particularly suitable are such pigment dispersions in extrusion-grade polyethylene having a melt index of about 7 to 8 grams per ten minutes and density of about 0.918 which are commercially available as concentrates. Such pigment concentrates are well known in the art and are usually prepared by heating the polymeric carrier to a sufficiently liquified state and mixing the colorant and resin particles until all elements are uniformly dispersed. Such concentrates are readily available commercially, a suitable example being "Ampacet 11171" white color concentrate (Ampacet Corp., Mt. Vernon, N.Y.). When the pigment concentrate is employed, amounts of from 5 to 30% by weight may be employed. It should be understood that the particular pigment employed should be compatible with the polymer blend and should not cause either an undesirable increase in viscosity or incompatibility with the blend or severe melt performance problems causing voids, web tear, etc. when extruded at the high melt temperatures herein.

EXAMPLE 2

(A) The procedure of Example 1 was repeated employing a blend comprising 60% polypropylene having a melt flow rate of 30 grams/10 mins., 30% polystyrene (Dow 685D) and 10% by weight $TiO_2$.

(B) The procedure of Example 1 was repeated employing a blend comprising 55% PD-131 polypropylene, 25% Dow 685D polystyrene and 20% of a concentrate comprising $TiO_2$ in a polyethylene carrier.

The blends of (A) and (B) were extruded at a melt temperature of 540° F. and drawn down to a coating thickness of 0.5 mil on paperboard producing a white pearlescent coated paperboard substrate. Melt performance and processing conditions were excellent at line speeds in excess of 1000 fpm. When the blend of (B) was reformulated to incorporate up to 10% of pigment concentrates employing ethylene-ethylacrylate or ethylene methylacrylate copolymers, the pigments were found to be incompatible with the polystyrene/polypropylene blends resulting in severe melt curtain problems such as voids and web tear at the melt temperature employed.

The blends of the invention and the extruded film produced therefrom are particularly useful in the extrusion coating of paperboard. The resultant substrate has increased rigidity over polyethylene extrusion coatings which permits use of lighter weight paperboard resulting in a savings in the amount of paperboard consumed in producing such items as paper cups thereby resulting in a more economical manufacturing process.

Additionally, the films are non-blocking, have a non-slippery feel and a highly attractive textured, pearlescent appearance. The films may be pigmented as desired to further enhance the aesthetic appearance of the coatings and final end products such as paper cups.

While the above description has been primarily directed to the extrusion coating of paperboard, the blends are equally suitable for use in extrusion coating of plastic films such as cellophane, polyesters, and polyolefin films.

It is thought that the invention and many of its attendant advantages will be understood from the foregoing description and it will be apparent that various changes may be made in the matter of the ingredients and identity and proportions without departing from the scope of the invention or sacrificing all of its material advantages, the form hereinbefore described being merely a preferred embodiment thereof.

I claim:

1. A process of coating a substrate with an extruded film of a polymer blend comprising:
    providing a blend of polystyrene and a polypropylene having a melt flow rate, as determined by ASTM-1238-G, within the range of about 30 to about 40 grams per ten minutes, the ratio of polypropylene to polystyrene in the blend being within the range of about 5:1 to 2:1;
    extruding said polymer blend without substantial degradation at a melt temperature of about 475° F. to about 575° F. to contact said substrate;
    passing said coated substrate to contact a chill roll maintained at a temperature of about 120°–200° F. to form an adhered layer of said extruded polymer blend on said substrate.

2. A process as claimed in claim 1 wherein said extrudate exits a 30 mil die and is drawn down to a thickness within the range of about 0.3 to 1 mil.

3. A process as claimed in claim 2 wherein said polymer blend comprises from about 50 to 70% by weight of polypropylene, from about 10 to 30% by weight of polystyrene and up to 10% by weight of a pigment.

4. A process as claimed in claim 2 wherein said polymer blend comprises from about 50% to 70% by weight polypropylene, from about 10 to 30% by weight polystyrene and from about 5 to 30% by weight of a concentrate of pigment in a polyethylene carrier.

5. The process of claim 1 wherein said substrate is paperboard.

* * * * *